United States Patent
Jiang et al.

(10) Patent No.: US 12,445,509 B2
(45) Date of Patent: Oct. 14, 2025

(54) METHOD AND APPARATUS FOR SELECTING SERVER, DEVICE, AND MEDIUM

(71) Applicant: BIGO TECHNOLOGY PTE. LTD., Mapletree Business (SG)

(72) Inventors: Yan Jiang, Shanghai (CN); Guang Wang, Guangzhou (CN); Wenhao Fang, Guangzhou (CN)

(73) Assignee: BIGO TECHNOLOGY PTE. LTD., Mapletree Business (SG)

( * ) Notice: Subject to any disclaimer, the term of this patent is extended or adjusted under 35 U.S.C. 154(b) by 0 days.

(21) Appl. No.: 18/549,644

(22) PCT Filed: Feb. 11, 2022

(86) PCT No.: PCT/CN2022/076102
§ 371 (c)(1),
(2) Date: Sep. 8, 2023

(87) PCT Pub. No.: WO2022/188591
PCT Pub. Date: Sep. 15, 2022

(65) Prior Publication Data
US 2024/0297914 A1    Sep. 5, 2024

(30) Foreign Application Priority Data
Mar. 9, 2021    (CN) .......................... 202110256468.7

(51) Int. Cl.
*H04L 65/403* (2022.01)
*H04L 43/0852* (2022.01)
(Continued)

(52) U.S. Cl.
CPC ........ *H04L 65/403* (2013.01); *H04L 43/0852* (2013.01); *H04L 65/1069* (2013.01); *H04L 65/80* (2013.01)

(58) Field of Classification Search
CPC ............. H04L 12/1813; H04L 12/1818; H04L 12/1822; H04L 12/1827; H04L 65/1063;
(Continued)

(56) References Cited

U.S. PATENT DOCUMENTS 11,736,553 B1 *   8/2023   Dunne .................. H04L 65/403
                                                              709/204
11,863,616 B1 *   1/2024   Rao ...................... H04L 67/1021
(Continued)

FOREIGN PATENT DOCUMENTS

CN          1852488 A       10/2006
CN        101034960 A        9/2007
(Continued)

OTHER PUBLICATIONS

Deng, Yunhua, et al. "The server allocation problem for session-based multiplayer cloud gaming." IEEE Transactions on Multimedia 20.5 (2017): 1233-1245. (Year: 2017).*
(Continued)

*Primary Examiner* — Vivek Srivastava
*Assistant Examiner* — William C Mcbeth
(74) *Attorney, Agent, or Firm* — Dilworth & Barrese, LLP.; Michael J. Musella, Esq.

(57) ABSTRACT

Provided is a method for selecting a server. The method includes: receiving a first group call request from a calling party of a target group, wherein the first group call request carries information of target regions of session members in the target group; determining, according to first delay periods of user devices in each of the target regions in data communication with directly connected servers, a first server corresponding to the each of the target regions; and determining, according to an average delay period of the first
(Continued)

Receiving a first group call request from a calling party of a target group, wherein the first group call request carries information of target regions of session members in the target group — S101

Determining, according to first delay periods of user devices in each of the target regions in data communication with directly connected servers, a first server corresponding to the each of the target regions — S102

Determining, according to an average delay period of the first server in data communication with the user devices in the each of the target regions, a central server for a group call of the target group — S103 server in data communication with the user devices in the each of the target regions, a central server for a group call of the target group.

16 Claims, 5 Drawing Sheets

(51) Int. Cl.
*H04L 65/1069* (2022.01)
*H04L 65/80* (2022.01)

(58) Field of Classification Search
CPC .............. H04L 65/1069; H04L 65/403; H04L 65/4061; H04L 67/101; H04L 67/1021; H04L 67/141; H04M 3/56; H04M 3/562; H04M 3/567; H04N 7/15; H04N 7/152; H04W 4/10; H04W 76/45
See application file for complete search history.

(56) References Cited

U.S. PATENT DOCUMENTS

| | | | |
|---|---|---|---|
| 2003/0153341 A1* | 8/2003 | Crockett | H04W 76/45 455/515 |
| 2008/0063173 A1* | 3/2008 | Sarkar | H04L 65/403 379/202.01 |
| 2008/0266383 A1* | 10/2008 | Shah | H04L 12/1818 348/E7.083 |
| 2013/0196696 A1 | 8/2013 | Brittain | |
| 2014/0002584 A1* | 1/2014 | Moon | H04L 12/1818 348/14.08 |
| 2014/0267573 A1* | 9/2014 | Aziz | H04L 12/1818 348/14.09 |
| 2014/0341085 A1 | 11/2014 | Suryavanshi et al. | |
| 2015/0249547 A1* | 9/2015 | Layman | H04L 65/403 370/260 |
| 2016/0212273 A1* | 7/2016 | Tsypnyatov | H04M 3/562 |
| 2016/0241604 A1* | 8/2016 | Klein | H04L 65/403 |
| 2016/0254996 A1 | 9/2016 | Zhao et al. | |
| 2016/0286165 A1* | 9/2016 | Sorokin | H04L 12/1818 |
| 2017/0024259 A1* | 1/2017 | Mecklin | H04L 65/403 |
| 2017/0134253 A1* | 5/2017 | Wang | H04L 67/101 |
| 2017/0257415 A1* | 9/2017 | Hassan | H04L 65/403 |
| 2017/0264449 A1* | 9/2017 | Seetharaman | H04L 67/101 |
| 2018/0361235 A1* | 12/2018 | Hunter | H04L 67/1021 |
| 2019/0158546 A1* | 5/2019 | Page | H04L 65/403 |
| 2020/0177683 A1 | 6/2020 | Zhao et al. | |
| 2022/0188172 A1* | 6/2022 | Gupta | H04L 67/1021 |
| 2022/0232066 A1* | 7/2022 | Subramaniam | H04L 67/101 |

FOREIGN PATENT DOCUMENTS

| | | |
|---|---|---|
| CN | 112104682 A | 12/2020 |
| CN | 112202755 A | 1/2021 |
| CN | 112822221 A | 5/2021 |
| CN | 113055460 A | 6/2021 |
| EP | 1035703 A1 | 9/2000 |

OTHER PUBLICATIONS

Zhang, Shuopeng, et al. "Server selection and topology control for multi-party video conferences." Proceedings of Network and Operating System Support on Digital Audio and Video Workshop. 2014. (Year: 2014).*
Extended European search report of counterpart European application No. 22766117.0 issued on Apr. 22, 2024.
International search report of PCT application No. PCT/CN2022/076102 issued on Apr. 18, 2022.

* cited by examiner

METHOD AND APPARATUS FOR SELECTING SERVER, DEVICE, AND MEDIUM

CROSS-REFERENCE TO RELATED APPLICATIONS

This application is a U.S. national stage of international application No. PCT/CN2022/076102, filed on Feb. 11, 2022, which is based on and claims priority to Chinese Patent Application No. 202110256468.7, filed on Mar. 9, 2021 and entitled "SERVER SELECTION METHOD AND APPARATUS, EQUIPMENT AND MEDIUM," the disclosures of which are herein incorporated by references in their entireties.

TECHNICAL FIELD

The present disclosure relates to the field of communication technologies, in particular to a method and an apparatus for selecting a server, a device, and a medium.

BACKGROUND

In the era of Internet, people all over the world are capable of conveniently making multi-person audio and video calls over the Internet. For these calls, data is forwarded through a large number of servers deployed in the world. The quality of the audio and video calls is closely related to selection of the servers. Especially in a group call scenario, as the number of members joining a group and time points for joining the group are uncertain each time a group call is initiated, it is a challenge to select the servers for the group call, and selection of a central server is particularly strict under the data forwarding architecture based on the central server.

SUMMARY

Embodiments of the present disclosure provide a method and an apparatus for selecting a server, a device, and a medium.

Some embodiments of the present disclosure provide a method for selecting a server. The method includes:
receiving a first group call request from a calling party of a target group, wherein the first group call request carries information of target regions of session members in the target group;
determining, according to first delay periods of user devices in each of the target regions in data communication with directly connected servers, a first server corresponding to the each of the target regions; and
determining, according to an average delay period of the first server in data communication with the user devices in the each of the target regions, a central server for a group call of the target group.

Some embodiments of the present disclosure provide an electronic device for selecting a server. The electronic device at least includes a processor and a memory storing one or more computer programs therein, wherein the processor, when loading and running the one or more computer programs, is caused to perform the above method for selecting the server.

Some embodiments of the present disclosure provide a non-transitory computer-readable storage medium. The non-transitory computer-readable storage medium stores one or more computer programs therein. The one or more computer programs, when loaded and run by a processor, cause the processor to perform the above method for selecting the server.

BRIEF DESCRIPTION OF DRAWINGS

For clearer description of the technical solutions in the embodiments of the present disclosure, the following briefly describes the accompanying drawings required for describing the embodiments. Apparently, the accompanying drawings in the following description show merely some embodiments of the present disclosure, and those of ordinary skill in the art may still derive other drawings from these accompanying drawings without any creative efforts.

DETAILED DESCRIPTION

Figure 1:
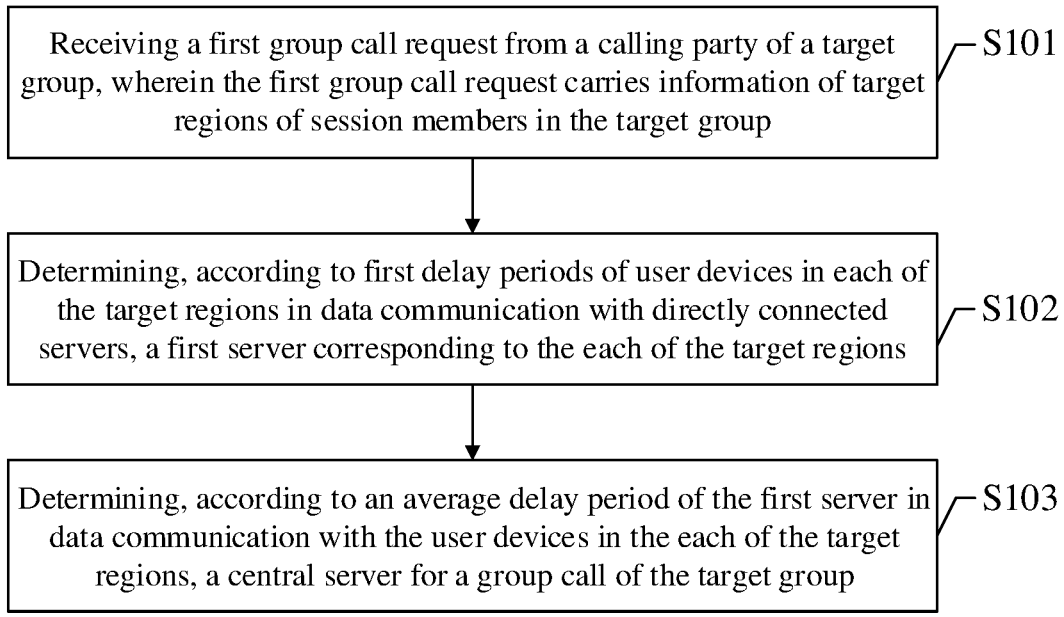
FIG. 1 is a schematic diagram of a server selection process according to some embodiments of the present disclosure.

The present disclosure will be further described in detail with reference to the accompanying drawings. Apparently, the described embodiments are only a part of embodiments of the present disclosure, and are not all embodiments. All other embodiments derived from the embodiments of the present disclosure by those skilled in the art without any creative work fall within the protection scope of the present disclosure.

For clearer understanding, some concepts involved in the embodiments of the present disclosure are explained hereinafter.

The central server is a server for achieving the functions, such as session management, session member information maintenance and statistics, congestion control, and packet loss prevention in group call scenarios. All data packets in a group call are processed or forwarded by the central server.

The forwarding server is a server for forwarding data between the central server and user devices of session members in the group call scenario, and does not involve in data processing.

In an actual application scenario, in the case that a user needs to perform group communication with other users, such as an online meeting, platform software for the group call is installed on the user device of the user in advance, and an account (referred to as the first account for convenience of explanation) is registered and logged in on the platform software. Then, a request for establishing a group with the accounts of other users (referred to as the second account for convenience of explanation) is input through the user device.

It should be noted that there are many ways of inputting the request for establishing a group, for example, by means of voice or by means of tapping a virtual button displayed on a user display interface by the user. The specific way of inputting the request for establishing the group is flexibly set according to actual needs, and is not specifically limited here.

Upon receiving the request for establishing the group with the second accounts input by the user, the user device generates a group joining request and respectively sends the group joining request to the user devices logged by the second accounts, such that the second accounts needing group communication are joined in the same group. The group joining request carries identification information of the second accounts. In the embodiments of the present disclosure, for convenience of description, a second account is a session member in the group in the case that the second account joins the group.

In an actual application process, in the case that a session member in the group wants to perform the group call, a request for establishing a group call is input by the user device. Upon receiving the request for establishing the group call, the user device generates a group call request (referred to as the first group call request for convenience of description) and sends the group call request to an electronic device for determining the central server, such that the central server is assigned for the group by the electronic device. The user device of the session member initiating the group call is a calling party of the group, and the user device of the session member receiving the group call invitation initiated by the calling party and joining the group call is a called party of the group.

In some possible implementations, upon receiving the first group call request from the calling party of the target group, the electronic device acquires delay periods of the calling party of the target group in data communication with directly connected servers, and directly determines the server with the minimum delay period as the central server. For the called party of the target group, upon receiving the group call invitation initiated by the calling party, the server with the minimum delay period is determined as a forwarding server according to delay periods of the called party in data communication with servers directly connected thereto, such that the data from the called party is forwarded to the central server by the forwarding server, or the data from the central server is received by the forwarding server and forwarded to the called party. In the subsequent group call of the target group, the central server receives the data from the calling party and the forwarding server, and manages and distributes the received data. For example, the central server receives audio and video data from the calling party and sends the audio and video data from the calling party to the forwarding server corresponding to each called party, or receives the audio and video data from any forwarding server, makes multiple copies, and distributes each copy of the audio and video data to the calling party and the forwarding servers corresponding to other called parties.

For the abovementioned method for determining the central server, in the case that the central server is determined only according to the delay periods of the calling party with respect to the directly connected servers, the forwarding server with a great communication delay with the central server cannot forward the data in the group call in time, such that the experience of the session member corresponding to the forwarding server participating in the group call is affected, and the quality of the group call is reduced. As a result, the call qualities of different session members in the target group are greatly different, the delays in data communication of the called parties with a longer link in data communication with the central server in the group call process are great, and thus the user experience is affected.

For example, in the case that the group includes two session members with target regions of China and one session member with the target region of the United States, the determined central server is likely in the United States where the session member in the United States initiates the group call. In this case, the audio and video data packets of any session member in China need to be forwarded to the central server in the United States, and then sent back to the user device of the other session member in China, such that the delay in data communication between the two session members of which the target regions are China is great.

In order to solve the above problems, the embodiments of the present disclosure provide a method and an apparatus for selecting a server, a device, and a medium. In the process of determining the central server, upon receipt of the first group call request from the calling party of the target group, the information of the target region in the first group call request is acquired, and the first server corresponding to the target region is determined for the information of each target region according to the first delay periods of the user devices in the target region in data communication with the directly connected servers. For each acquired first server, the average delay period of the server in data communication with the user devices in each target region is acquired, and the central server for the group call of the target group is determined based on the average delay period corresponding to each acquired first server, such that the regions of the session members in the group call in the target group are taken into full consideration, and the accuracy of the determined central server and the quality of the group call are improved.

It should be noted that the application scenarios in the above embodiments are only for convenience of explaining the exemplary scenarios, and not a limitation to the application scenarios of the method and the apparatus for selecting the server, the device, and the medium in the embodiments of the present disclosure. Those skilled in the art should know that the method and apparatus for selecting the server, the device, and the medium in the embodiments of the present disclosure are applicable to all application scenarios requiring the central server, such as online meetings, streaming online classes, group call scenarios of Internet instant messaging products, and the like.

First Embodiments

FIG. 1 is a schematic diagram of a server selection process according to some embodiments of the present disclosure, and the process includes the following processes.

In S101, a first group call request is received from a calling party of a target group, wherein the first group call request carries information of target regions of session members in the target group.

The method for selecting the server in the embodiments of the present disclosure is applicable to an electronic device providing background services, and the electronic device is an intelligent device providing background services or a server providing background services.

For convenient and accurate determination of the central server, in the case that the target group needs a group call, the calling party of the target group sends the first group call request to the electronic device, and the first group call request carries the information of the regions (referred to as the target region for convenience of description) of the session members in the current group and first identification information. The first identification information is configured to identify that the group call request is from the calling party of the group call.

Upon receiving the group call request of the target group, the electronic device parses the group call request, and determines the group call request as the first group call request from the calling party of the target group in the case that the first identification information in the group call request is parsed. The electronic device needs to assign a central server for the call of the target group to facilitate subsequently transmission and management of the data generated in the call through the central server. The electronic device performs corresponding processing based on the information of the target regions of the session members in the target group in the first group call request, such that the central server for the group call of the target group is determined.

In the embodiments of the present disclosure, the region is a geographical region with any size, such as a province, a city, a prefecture, a state, and a country, or a user-defined geographical region. For example, a community of a member is determined as a region, and the like. The target regions of all session members may be different levels of geographical regions. For example, a target region of a session member A is a community, and a target region of a session member B is a prefecture. In a specific implementation process, the target regions of the session members are flexibly set according to requirements, which are not limited herein.

In user-defining the geographical region, the distribution of the session members is considered. For example, in the case that session members in a community are great, and a demand for data communication is great, the community is determined as a region, and the target regions of the session members in the community are the community. In the case that session members in a province is less, and a demand for data communication is less, the province is determined as a region, and the target regions of the session members in the province are the province.

It should be noted that the information of the target region includes the identification information of the target region to distinguish different regions. The identification information of the target region is a number, a letter, a special symbol, a character string, or in other forms, and those capable of uniquely identifying the target region can be determined as the identification information of the target region in the embodiments of the present disclosure.

In S102, a first server corresponding to each of the target regions is determined according to first delay periods of user devices in the each of the target regions in data communication with directly connected servers.

In the embodiments of the present disclosure, based on the distribution of the session members in the group, one server with lower delay in data communication with the user devices of the session members is determined, and the server is determined as the central server of the current group call, such that the problem of an excessive delay in data communication between the called parties with the longer links in data communication with the central server is avoided.

Specifically, the delay periods (referred to as the first delay period for convenience of description) of the user devices in the target region in data communication with the directly connected servers are acquired, and the first server corresponding to the target region is determined according to the acquired first delay periods. Subsequently, corresponding processing is performed based on the first servers corresponding to the target regions, and the central server for the group call of the target group is determined from the determined first servers.

In the embodiments of the present disclosure, for accurate determination of the first server corresponding to each target region, a screening condition is predetermined. Upon acquisition of the first delay periods of the user devices in the target region in data communication with the directly connected servers based on the above embodiments, whether any acquired first delay period meets the predetermined screening condition is determined, and the server of which the first delay period meets the predetermined screening condition is determined as the first server corresponding to the target region.

In setting the screening condition, different screening conditions are set according to different scenarios. In order to ensure the communication quality of the subsequent group calls, the screening condition is that the first delay period is the minimum value. In order to avoid the excessive cost of the group call upon determination of the first server as the central server, the screening condition is that the first delay period is less than a delay threshold (referred to as the first delay threshold for convenience of description) corresponding to the target region.

It should be noted that the first delay period corresponding to any server is an average value, a maximum value, a minimum value, and the like of the delay periods of the user devices in the target region in data communication with the server, or the delay period of any user device in the target region in data communication with the server.

In some possible implementations, in the case that the screening condition is that the first delay period is the minimum value, the minimum value of the acquired first delay periods is determined upon acquisition of the first delay periods of the user devices in the target region in data communication with the directly connected servers, and the server corresponding to the minimum value is determined as the first server corresponding to the target region.

In some embodiments of the present disclosure, the first delay threshold corresponding to any target region is determined according to any first delay period corresponding to the target region and a predetermined fluctuation value, or determined according to any first delay period corresponding to the target region and a predetermined ratio. Any first delay period is the minimum value, the maximum value, and the like of the first delay periods corresponding to the target region. For example, in the case that the first delay threshold corresponding to any target region is determined according to the minimum value of the first delay periods corresponding to the target region and the predetermined fluctuation value, the minimum value of the first delay periods corresponding to the target region is 100 ms, and the predetermined fluctuation value is 50 ms, the first delay threshold corresponding to the target region is 150 ms. In the case that the first delay threshold corresponding to any target region is determined according to the minimum value of the first delay periods corresponding to the target region and the predetermined ratio, the minimum value of the first delay periods corresponding to the target region is 100 ms, and the predetermined ratio is 20%, the first delay threshold corresponding to the target region is 120 ms.

In some possible implementations, in the case that the screening condition is that the first delay period is less than the delay threshold corresponding to the target region, for any target region, upon acquisition of the first delay periods of the user devices in the target region in data communication with the directly connected servers, whether the acquired first delays periods are less than the first delay threshold corresponding to the target region is sequentially or randomly determined. In the case that a first delay period less than the first delay threshold corresponding to the target region exists, the server corresponding to the first delay period is directly determined as the first server corresponding to the target region. Alternatively, the first delay periods less than the first delay threshold corresponding to the target region are determined, the server corresponding to any of the first delay periods less than the first delay threshold corresponding to the target region is determined as the first server corresponding to the target region.

In S103, the central server for the group call of the target group is determined based on an average delay period of the first server in data communication with the user devices in the target regions.

Upon acquisition of the first server corresponding to each target region based on the above embodiments, for each first server, the delay periods (referred to as the second delay period for convenience of description) of the first server in data communication with the user devices in the target regions are determined, and the average delay period corresponding to the target region is determined according to the acquired second delay periods. Corresponding processing is carried out based on the average delay period corresponding to each target region, and the central server for the group call of the target group is determined from the acquired first servers, such that the appropriate central server is selected based on the information of the regions of the session members in the target group.

In some possible implementations, for accurate determination of the central server for the group call of the target group, determining, according to the average delay period of the first server in data communication with the user devices in each target region, the central server for the group call of the target group includes:

determining any first server of which the average delay period meets a predetermined first communication condition as the central server.

For accurate determination of the central server for the group call of the target group, in the embodiments of the present disclosure, the communication condition (referred to as a first communication condition for convenience of explanation) is predetermined. Upon acquisition of the average delay period corresponding to each first server based on the above embodiments, for any acquired average delay period, whether the average delay period meets the predetermined first communication condition is sequentially or randomly determined. In the case that an average delay period meets the predetermined first communication condition, the server corresponding to the average delay period is directly determined as the central server for the group call of the target group. Alternatively, the acquired average delay periods meeting the predetermined first communication condition are determined, the server corresponding to any of the average delay periods meeting the predetermined first communication condition is determined as the central server for the group call of the target group.

In setting the first communication condition, different first communication condition may also be set according to different scenarios. In order to ensure the communication quality of the group call, the server meeting the first communication condition is the server with the minimum first delay period. In order to balance the load, the first server of which the average delay period meets the first communication condition is the first server with the minimum load among the first servers corresponding to the predetermined number of front average delay periods in a descending order of the average delay periods. In a specific implementation process, flexible setting may be performed according to actual needs, which is not limited herein.

In the embodiments of the present disclosure, upon receipt of the first group call request from the calling party of the target group, the information of each target region in the first group call request is acquired, and the first server corresponding to the target region is determined for the information of the target region according to the first delay periods of the user devices in the target region in data communication with the directly connected servers. For each acquired first server, the average delay period of the server in data communication with the user devices in the target regions is acquired, and the central server for the group call of the target group is determined based on the average delay period corresponding to each acquired first server, such that the regions of the session members in the group call in the target group are taken into full consideration, and the accuracy of the determined central server and the quality of the group call are improved.

Second Embodiments

For full consideration of the distribution of the session members in the group call and accurate determination of the central server, based on the above embodiments, acquiring the average delay period of the first server in data communication with the user devices in the each of the target regions in the embodiments of the present disclosure includes:

acquiring a weight value corresponding to each of the target regions; and determining, according to second delay periods and the weight value corresponding to each of the target regions, the average delay period corresponding to the first server, wherein the second delay periods corresponding to any target region are delay periods of the first server in data communication with the user devices in the each of the target regions.

In actual application scenarios, in a group call of a group, the number of session members in the group call in any target region in the group reflects the activity of the group call in the target region to a certain extent. The more the number of the session members requiring the group call in the target region, the higher the activity of the group call in the target region. The less the number of the session members requiring the group call in the target region, the lower the activity of the group call in the target region. The numbers of the session members requiring the group call in different target regions are different, that is, the activities of different target regions are different, such that conditions on the determined central server in the target regions are different. In general, it is necessary to ensure the call quality of most session members requiring the group call in the group call as much as possible, that is, to ensure the call quality of the session members requiring the group call in the target region with high activity in the group call as much as possible. Therefore, in the embodiments of the present disclosure, the weight value corresponding to each target region is determined based on the activity of each target region in the group, that is, the number of the session members in each target region. Then, for each first server, the average delay period corresponding to the first server is determined according to the second delay periods of the first server in data communication with the user devices in each target region and the weight value corresponding to the target region. Any first server of which the average delay period meets the predetermined first communication condition is determined as the central server for the group call of the target group, such that the appropriate central server is selected according to the distribution of the session members in the target group and the activity of the target regions.

In determining the weight value corresponding to each target region, the higher the activity of the target region in the group, the greater the weight value corresponding to the target region; the lower the activity of the target region in the group, the less the weight value corresponding to the target region.

It should be noted that the second delay period of the first server in data communication with the user device in any target region is the average value, the maximum value, the minimum value, and the like of the delay periods of the first server in data communication with the user devices in the target region, or the delay period of any user device in the target region in data communication with the first server.

Figure 2:
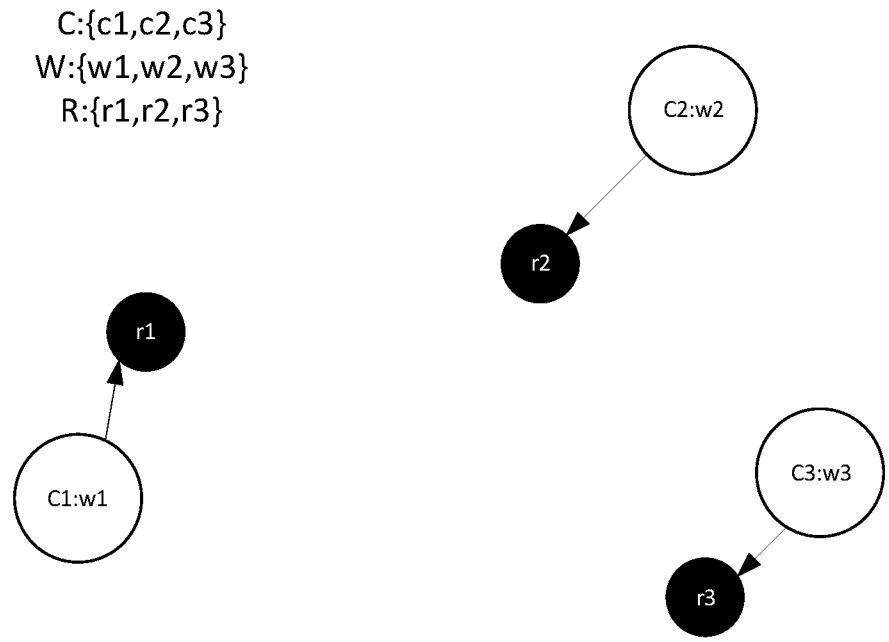
FIG. 2 is a schematic diagram of a scenario of a determined first server according to some embodiments of the present disclosure.

For example, FIG. 2 is a schematic diagram of a scenario of a determined first server according to some embodiments of the present disclosure. As shown in FIG. 2, assuming that session members in a group are distributed in n different target regions, a first region set including the target regions is C, a weight set including the weight values corresponding to the target regions is W, $c_i$ represents the $i^{th}$ target region, and $w_i$ represents the weight corresponding to $c_i$, wherein $1 \leq i \leq n$. Upon determination of the first server corresponding to each target region based on the method in the above embodiments, each first server is added to the candidate server set R $(r_1, r_2 \ldots, r_n)$. Any first server in the candidate server set R $(r_1, r_2 \ldots, r_n)$ of which the average delay period meets the predetermined first communication condition is determined as the central server of the current group call.

In some possible implementations, determining, according to the second delay periods and the weight value corresponding to each of the target regions, the average delay period corresponding to the first server includes:
determining products of the second delay periods corresponding to the each of the target regions and the corresponding weight value; and
determining, based on the products and the weight value, the average delay period corresponding to the first server.

In a specific implementation process, a weight sum of the weight values corresponding to all target regions is determined, and the products of the second delay periods corresponding to the target region and the weight value corresponding to the target region are determined for each target region. According to the products corresponding to the target regions and the determined weight sum, the average delay period corresponding to the first server is determined.

In one possible implementation, according to the second delay periods and the weight values correspond to the target regions, the average delay period corresponding to the first server is determined by the following formula:

$$AVG\ (RTT_i) = \frac{2}{\sum_{j=1}^{j=n} w_j} \sum_{j=1}^{j=n} RTT_{ji} * w_j;$$

wherein AVG $(RTT_i)$ represents the average delay period corresponding to the $i^{th}$ first server, $w_j$ represents the weight value corresponding to the $j^{th}$ target region, $\Sigma_{j=1}^{j=n} w_j$ represents the weight sum determined according to the weight values corresponding to the n target regions, and $RTT_{ji}$ represents the second delay period of the $i^{th}$ first server in data communication with the user device in the $j^{th}$ target region.

In the embodiments of the present disclosure, the activity of each target region is considered in determining the average delay period corresponding to any first server, and the weight value corresponding to each target region is determined according to the activity of each target region, such that the determined average delay period is closer to an actual group call participating situation, and the accuracy of the subsequently assigned central server is improved.

In a possible implementation, for convenient determination of the weight values corresponding to the target regions, in the case that the first group call request further carries target group identification information of the target group, acquiring the weight value corresponding to the each of the target regions includes:
determining, in the case that the target group identification information is not matched with group identification information assigned with the weight value, the weight value corresponding to the each of the target regions according to a number of the session members in the each of the target regions in the target group.

In order to reflect the user activity of each target region through the weight value corresponding to each target region, in the embodiments of the present disclosure, the weight value corresponding to each target region is determined according to the number of the session members in each target region in the target group. Specifically, when receiving the first group call request from the calling party of the target group, the electronic device parses the first group call request and acquires the information of the target region of each session member in the target group in the first group call request. According to the information of the target region of each session member, the activity of each target region in the target group is counted, that is, the number of the session members in each target region in the target group is counted, such that the weight value corresponding to each target region in the target group is determined.

In one possible implementation, for convenient determination of the central server when the target group performs the next group call, in the embodiments of the present disclosure, upon determination of the weight values corresponding to the target regions in the target group based on the above embodiments, the weight values corresponding to the target regions in the target group and the group identification information (referred to as the target group identification information for convenience of explanation) of the target group are saved correspondingly, that is, the weight value corresponding to each region in the group and the group identification information of the group are saved correspondingly. Subsequently, upon receiving the first group call request from the calling party of the target group, the electronic device parses the first group call request to acquire the information of the target region of each session member in the target group and the target group identification information of the target group in the first group call request. Then, the target group identification information is matched with each group identification information assigned with the weight value, and the weight value corresponding to each target region in the target group is determined based on the matching result.

In actual application scenarios, there may be a case that the target group performs the group call for the first time. In matching the acquired target group identification information with each group identification information assigned with the weight value, the target group identification information is not matched with each group identification information assigned with the weight value. In this case, the number of the session members in each target region in the target group is determined according to the information of each target region in the first group call request based on the method in the above embodiments, and the weight value corresponding to each target region is determined according to the number of the session members in each target region.

In some possible implementations, for convenient determination of the weight value corresponding to each target region, in the embodiments of the present disclosure, a unit weight value corresponding to any session member in the group is predetermined, for example, the unit weight value corresponding to any session member in the target group is 1.0. The weight value corresponding to each target region is determined based on the number of the session members in each target region in the target group and the predetermined unit weight value corresponding to any session member.

For example, the predetermined unit weight value corresponding to any session member is 1.0. The number of the session members in each target region in the target group is counted, that is, the distribution of the session members is determined. Assuming that the target group includes two session members with the target region of China, one session member with the target region of the United States, and one session member with the target region of India, according to the number of the session members in each target region, the weight value corresponding to the target region of China is determined as 2*1.0=2.0, the weight value corresponding to the target region of the United States is determined as 1*1.0=1.0, and the weight value corresponding to the target region of India is determined as 1*1.0=1.0.

In actual application scenarios, there may also be a case where the target group does not perform the group call for the first time. In matching the acquired target group identification information with each group identification information assigned with the weight value, the target group identification information is matched with group identification information assigned with the weight value. In this case, the weight value corresponding to each region corresponding to the matched group identification information is acquired, and the weight value corresponding to each target region is determined.

Upon determination of each first server and the weight value corresponding to each target region based on the above embodiments, for each first server, the average delay period corresponding to the first server is determined based on the second delay periods of the first server in data communication with the user devices in the target regions and the weight value corresponding to the target regions. Subsequently, the central server of the target group is determined based on the average delay periods corresponding to the first servers.

There may be a case that although weight values corresponding to a group are saved, and the newly added region is different from the regions of other session members in the group as session members of a new region are added to the group in a subsequent group call, such that the saved weight values corresponding to all regions corresponding to the group do not include the weight value corresponding to the newly added region. In this case, in determining the weight value corresponding to the newly added region in the group subsequently, the weight value corresponding to the newly added region is determined for each newly added region according to the number of the session members in the newly added region in the group.

In some embodiments, the weight value corresponding to the newly added region is determined according to the number of the session members in the newly added region in the group and the predetermined unit weight value corresponding to any session member.

Figure 3:
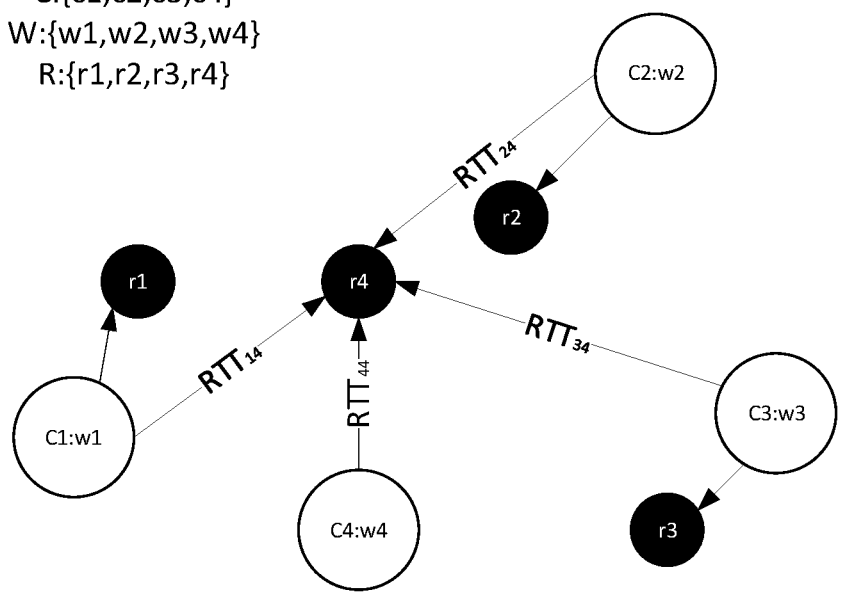
FIG. 3 is a schematic diagram of a scenario of determining a central server according to some embodiments of the present disclosure.

FIG. 3 is a schematic diagram of a scenario of determining a central server according to some embodiments of the present disclosure. As shown in FIG. 3, $c_i$ represents the $i^{th}$ target region, $w_i$ represents the weight corresponding to $c_i$, and $r_i$ represents the $i^{th}$ first server, and $1 \le i \le 4$. Taking the first server $r_4$ as an example, in the case that the weight value corresponding to each target region is 1, the average delay period corresponding to the first server $r_4$ is expressed by the following formula:

$$AVG\ (RTT_4) = \frac{2\ (RTT_{14} + RTT_{24} + RTT_{34} + RTT_{44})}{w_1 + w_2 + w_3 + w_4},$$

wherein AVG ($RTT_4$) represents the average delay period corresponding to the first server $r_4$, $w_j$ represents the weight value corresponding to the $j^{th}$ target region, and $RTT_{j4}$ represents the second delay period of the first server $r_4$ in data communication with the user device in the $j^{th}$ target region.

Based on the above formula, the average delay periods corresponding to the first servers $r_1$, $r_2$ and $r_3$ are determined.

Finally, the server corresponding to min (AVG ($RTT_j$)) is determined as the central server of the current group call.

Third Embodiments

For improvement of the quality of the group call, based on the above embodiments, upon determining, according to the first delay periods of the user devices in the each of the target regions in data communication with the directly connected servers, the first server corresponding to the each of the target regions, and prior to determining, according to the average delay period of the first server in data communication with the user device in the each of the target regions, the central server for the group call of the target group, the method further includes:
    acquiring a total delay period of each of second servers, other than the first servers, in data communication with first servers; and
    determining any of the second servers of which the total delay period meets a predetermined second communication condition as the first server.

Upon determination of each first server based on the above embodiments, in order to ensure the quality of the group call and avoid the existence of servers other than each first server with better communication quality, for each second server other than the first servers, the delay periods (referred to as the third delay period for convenience of description) of the second server in data communication with the first servers are acquired, and the total delay period corresponding to the second server is determined according to the third delay periods.

For improvement of the quality of the group call, in the embodiments of the present disclosure, the second communication condition is predetermined. The second communication condition is that the total delay period is a minimum value or the total delay period is less than a predetermined delay threshold (referred to as the second delay threshold for convenience of description). Upon acquisition of the total delay period corresponding to each second server based on the above embodiments, whether any acquired total delay period meets the predetermined second communication condition is determined, and any second server of which the total delay period meets the predetermined second communication condition is determined as the first server.

It should be noted that different values are set according to different scenarios in setting the second delay threshold. In the case that there is a strict condition on the delay period of the central server, the second delay threshold is set lower. For avoidance of missing of the second server with better communication quality than the first server corresponding to each target region, the second delay threshold is set higher. In a specific implementation process, flexible setting may be performed according to actual needs, which is not limited herein.

In some embodiments, in the case that the second communication condition is that the total delay duration is the minimum value, the minimum value of the acquired total delay periods is determined upon acquisition of the total delay periods corresponding to the second servers, and the second server corresponding to the minimum value is determined as the first server.

In some embodiments, in the case that the second communication condition is that the total delay period is less than the predetermined second delay threshold, whether the total delay periods are less than the predetermined second delay threshold is determined sequentially or randomly upon acquisition of the total delay periods corresponding to each second server. In the case that that there is a total delay period less than the predetermined second delay threshold, the second server corresponding to the total delay period is directly determined as the first server. Alternatively, the total delay periods less than the predetermined second delay threshold are determined, and the second server corresponding to any total delay period is selected from second servers of which the total delay periods are less than the predetermined second delay threshold and determined as the first server.

Figure 4:
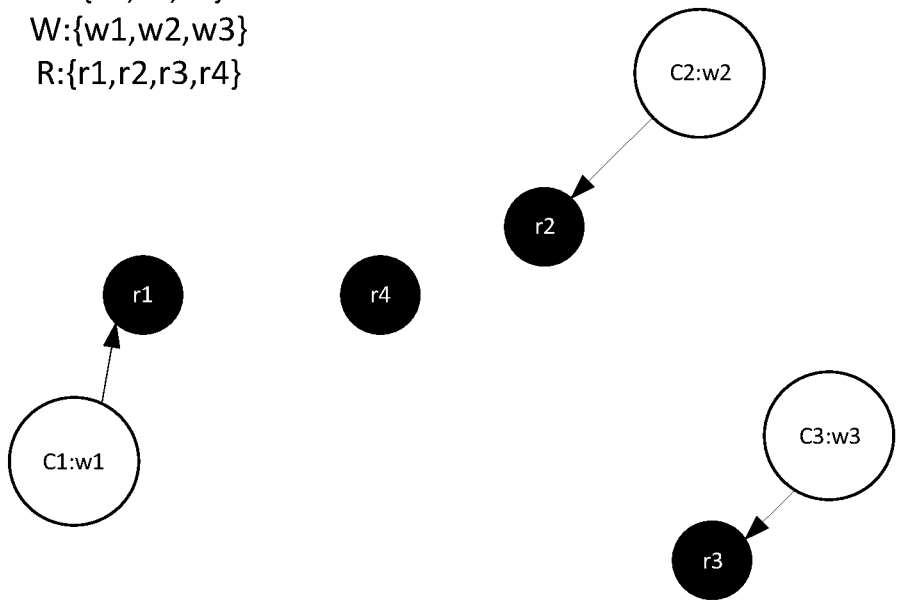
FIG. 4 is a schematic diagram of a scenario of updating a second server to be a first server according to some embodiments of the present disclosure.

For example, FIG. 4 is a schematic diagram of a scenario of updating a second server to be a first server according to some embodiments of the present disclosure. As shown in FIG. 4, $c_i$ represents the $i^{th}$ target region, $r_i$ represents the $i^{th}$ first server, $1 \leq i \leq 3$, and $r_4$ is the second server.

For each second server other than the first servers, the total delay period of the second server in data communication with the first servers is acquired, and the second server with the minimum total delay period is updated to the first server, that is, is added to the candidate server set R as $r_4$.

Assuming that the second delay period of the $i^{th}$ second server in data communication with the $j^{th}$ first server is represented, the second server $r_j$ with the minimum $\Sigma_{i=1}^{i=3} RTT_{ji}$ is added to the candidate server set R as $r_4$.

Upon determination of each first server based on the above embodiments, the weight value corresponding to each target region is acquired, and the average delay period corresponding to the first server is determined according to the second delay periods of the first server in data communication with the user devices in each target region and the weight value corresponding to each target region. Subsequently, the central server of the target group is determined based on the average delay period corresponding to each first server.

For example, taking FIG. 4 as an example, assuming that the weight value corresponding to each target region is 1, the average delay period corresponding to the first server $r_4$ is determined by the following formula:

$$AVG\ (RTT_4) = \frac{2\ (RTT_{14} + RTT_{24} + RTT_{34})}{w_1 + w_2 + w_3};$$

AVG ($RTT_4$) represents the average delay period corresponding to the first server $r_4$, $w_j$ represents the weight value corresponding to the $j^{th}$ target region, $1 \leq j \leq 3$, and $RTT_{j4}$ represents the second delay period of the first server $r_4$ in data communication with the user device in the $j^{th}$ target region.

Fourth Embodiments

For accurate determination of the central server, based on the above embodiments, the method in the embodiments of the present disclosure further includes:
receiving a second group call request from a called party of the target group, wherein the second group call request carries target group identification information of the target group;
acquiring group identification information matched with the target group identification information and corresponding to the central server; and
determining, based on the central server corresponding to the matched group identification information, the central server for the group call of the target group.

In the embodiments of the present disclosure, upon receiving the second group call request from the called party of the target group, the electronic device determines the central server for the group call of the target group according to the information in the second group call request, and sends the information of the determined central server to the called party, such that the called party participates in the group call of the target group subsequently.

In some embodiments, upon receiving a confirm operation of the access to the group call input by the user, the called party generates and sends a group call request (referred to as the second group call request for convenience of explanation). The second group call request carries the group identification information of the target group and the identification information (referred to as the second identification information for convenience of explanation) identifying that the second group call request is from the called party.

Upon receiving the group call request, the electronic device parses the group call request. In the case that the second identification information in the group call request is acquired, the group call request is the second group call request from the called party of the target group. The group identification information matched with the target group identification information and corresponding to the central server is determined based on the target group identification information in the second group call request. The central server (referred to as the target central server for convenience of description) corresponding to the matched group identification information is acquired. The target central server is determined as the central server for the group call of the target group, and the information of the central server is sent to the called party.

In order to further ensure the communication quality of the group call, in the embodiments of the present disclosure, upon determining the central server for the group call of the target group, the method further includes:

determining, according to information of a region of a target session member sending a group call request, a first link delay and a second link delay corresponding to the target session member, wherein the group call request is the first group call request or the second group call request, the first link delay is a link delay of a link over which the user device in the region of the target session member is in direct data communication with the central server, and the second link delay is a link delay of a link over which the user device in the region of the target session member is in data communication with the central server by virtue of forwarding by a forwarding server; and determining, based on the first link delay and the second link delay, a link over which the user device of the target session member is in data communication with the central server.

In some practices, for any session member in the target group, upon access of the session member to the group call, the user device of the session member collects data input by the session member, such as audio and video data, and then directly sends the collected data to the predetermined forwarding server corresponding to the session member, and the forwarding server forwards the data to the central server, such that the central server manages and forwards the data to the user device and the like of other session members in the group for processing. The forwarding server corresponding to any session member is determined by:

acquiring the delay periods of the target user device of the session member in data communication with the servers directly connected to the target user device; and determining the server corresponding to the minimum delay period as the forwarding server corresponding to the session member.

In the above manner, the forwarding server forwards the data input by the session member to the central server without considering whether the communication quality of the link between the forwarding server corresponding to the session member and the central server is great. As a result, once the communication quality of the link between the forwarding server corresponding to the session member and the central server is poor in the group call, the quality of the group call is reduced, and the user experience is affected.

In order to solve the above problem, upon determination of a central server of a group call, the information of the region of the session member (referred to as the target session member for convenience of explanation) sending the group call request is determined based on the information of the region of each session member in the target group in the received group call request. The first link delay of the link over which the user device in the region of the target session member is in direct data communication with the central server is acquired, and the second link delay of the link over which the user device in the region of the target session member is in data communication with the central server by virtue of forwarding by a forwarding server is determined. Then the first link delay is compared with the second link delay, and the link over which the user device of the target session member is in data communication with the central server is determined based on the comparison result.

The group call request is the first group call request or the second group call request.

In the case that the first link delay is less than the second link delay, the user device of the target session member is in direct data communication with the central server.

In the case that the first link delay is greater than the second link delay, the user device of the target session member is in data communication with the central server by virtue of forwarding by the forwarding server.

The second link delay is determined based on the delay period of the user device of the target session member in data communication with the forwarding server corresponding to the target session member and the delay period of the forwarding server corresponding to the target session member in data communication with the central server.

For example, in the case that the received group call request is a second group call request from a called party in the target group, the electronic device parses the second group call request to acquire the information of the region of the called party and the target group identification information in the second group call request. The target group identification information is matched with the group identification information corresponding to the central server, and the central server corresponding to the group identification information matched with the target group identification information is determined. Then the first link delay of the link over which the user device in the region of the called party is in direct data communication with the central server is determined, and the second link delay of the link over which the user device in the region of the called party is in data communication with the central server by virtue of forwarding by the forwarding server is determined. In the case that the first link delay is less than the second link delay, the called party is in direct data communication with the central server. In the case that the first link delay is greater than the second link delay, the called party is in data communication with the central server by virtue of forwarding by the forwarding server.

For another example, in the case that the received group call request is the first group call request from the calling party of the target group, the electronic device determines the information of the region of the target session member sending the first group call request, that is, the information of the region of the calling party based on the first group call request, and determines the central server for the group call of the target group based on the method in the above embodiments. The first link delay of the link over which the user device in the target region of the calling party is in direct data communication with the central server is acquired, and the second link delay of the link over which the user device in the region of the calling party is in data communication with the central server by virtue of forwarding by the forwarding server is acquired. In the case that the first link delay is less than the second link delay, the calling party is in direct data communication with the central server. In the case that the first link delay is greater than the second link delay, the calling party is in data communication with the central server by virtue of forwarding by the forwarding server.

Based on the method in the above embodiments, by comparing the first link delay corresponding to the target session member with the second link delay corresponding to the target session member, the optimal link for data communication with the central server is dynamically selected, such that the user experience is further optimized, and the communication quality of the group call is improved.

Fifth Embodiments

For convenient of subsequent accurate determination of the central server, based on the above various embodiments, the method in the embodiments of the present disclosure further includes:

acquiring, in the case that the target session member sending a group call request joins a current group call for the first time, information of a region of the target session member based on the group call request, wherein the group call request is the first group call request or the second group call request; and updating and saving a target weight value in the case that the target weight value corresponding to the region of the target session member is acquired from saved weight values corresponding to the target regions of the target group.

In group call scenarios, different groups have different requirements on the group call request. For example, some groups often perform the group call, and others occasionally perform the group call. The number of the group calls of the target group has an impact on the activities of the group calls in different regions, and then has an impact on the determined central server. Therefore, for convenience of subsequent accurate determination of the central server, in the embodiments of the present disclosure, the saved weight value corresponding to each target region of the target group is updated based on the group call request received by the electronic device in each group call process of the target group.

In some embodiments, an incremental weight value is predetermined. According to the information in the group call request, the information of the region of the target session member sending the group call request is determined. The target weight value corresponding to the region of the target session member is determined from the saved weight values corresponding to the target regions of the target group. According to the sum of the target weight value and the predetermined incremental weight value, the target weight value is updated and saved.

The predetermined incremental weight value is any value within a predetermined numerical range or a predetermined fixed value.

In an actual application process, in a group call of the target group, there may also be a case that a session member quits the group call due to network and other reasons, and then rejoins the group call. In the case that the electronic device directly updates, only according to the received group call request, the saved weight value corresponding to each target region of the target group, the weight value corresponding to the region of the session member is prone to increment due to multiple joining of a session member in the group call, such that the activity of the session member in the region in the group call is not accurate. Therefore, for accurate update of the weight value corresponding to each target region of the target group, in the embodiments of the present disclosure, prior to updating, according to the received group call request of the target group, the saved weight value corresponding to each target region of the target group, whether the target session member sending the group call request joins the current group call for the first time is determined. In the case that the target session member joins the current group call for the first time, the saved weight value corresponding to each target region of the target group is updated based on the received group call request of the target group based on the method in the above embodiments.

In some embodiments, the electronic device parses the group call request every time the electronic device receives the group call request of the target group, acquires the target group identification information in the group call request and the identification information of the target session member sending the group call request, and matches the target group identification information with the saved group identification information in the group call currently. In the case that there is no matched group identification information, the target group performs the group call for the first time, the target session member sending the group call request joins the current group call for the first time, and the target group identification information and the identification information of the target session member are correspondingly saved. In the case that there is matched group identification information, the identification information, corresponding to the matched group identification information, of the member joined the current group call is acquired, and the acquired identification information of the target session member is matched with each identification information of the member. In the case that there is matched identification information of the member, the target session member has joined the current group call, and the target session member does not join the current group call for the first time. In the case that there is no matched identification information of the member, the target session member has not joined the current group call, the target session member joins the current group call for the first time, and the target group identification information and the identification information of the target session member are correspondingly saved.

The group identification information and the identification information of the member are saved correspondingly according to each call of the target group. For example, the identification information of the session member joining the group call and the group identification information of the target group are correspondingly saved in the first group call of the target group, the identification information of the session member joining the $N^{th}$ group call and the group identification information of the target group are saved correspondingly in the $N^{th}$ group call of the target group, and N is a natural number greater than 0. Alternatively, the group identification information of the target group and the identification information of the session member joining the current group call are also saved correspondingly upon start of the current group call, and the group identification information of the target group and the identification information of the corresponding session member which are saved in the current group call process are deleted in the case that the current group call is ended.

For example, upon receipt of a group call request from a target session member in the target group, and determination of joining of the target session member to the current group call for the first time based on the method in the above embodiments, x is added to the target weight value corresponding to the target region of the session member. Assuming that for the weight value corresponding to each target region of the target group in the first group call of the target group, the weight value corresponding to China is 1.0, and the weight value corresponding to the United States is also 1.0. In the case that the target group performs the second group call, the group call request from the session member in the target region of China is received, and the target session member joins the current group call for the first time based on the method in the above embodiments, the target weight value corresponding to the region of the target session member is determined to be 1.0 from the saved weight values corresponding to the target regions of the target group, and the target weight value 1.0 is updated and saved according to the sum, that is, 1.0+x, of the target weight value 1.0 and the predetermined incremental weight value x.

In the case that the target group receives the group call request from the session member in the target region of the United States in the second group call, and the target session member joins the current group call for the first time based on the method in the above embodiments, the target weight value corresponding to the region of the target session member is determined to be 1.0 from the saved weight values corresponding to the target regions of the target group, and the target weight value 1.0 is updated and saved according to the sum, that is, 1.0+x, of the target weight value 1.0 and the predetermined incremental weight value x.

In actual application scenarios, there may also a case that a session member joins the target group upon many group calls of the target group, and the region of the session member is different from the regions of other session members in the target group. Upon subsequent receipt of the group call request from the newly joined session member, the newly joined session member joins the current group call for the first time based on the method in the above embodiments, and then the information of the region of the newly joined session member is acquired based on the received group call request. Based on the information of the region and the saved weight values corresponding to the target regions of the target group, it is determined that the region has no corresponding target weight value, and the target weight value cannot be updated based on the method in the above embodiments. Therefore, in the embodiments of the present disclosure, upon determination of joining of the target session member to the current group call for the first time based on the method in the above embodiment, it is also necessary to determine whether the target weight value corresponding to the region of the target session member can be acquired from the weight values corresponding to the target regions of the target group. In the case that the target weight value corresponding to the region of the target session member is acquired from the saved weight values corresponding to the target regions of the target group, the target weight value is updated and saved according to the sum of the predetermined incremental weight value and the target weight value based on the method in the above embodiments.

In some embodiments, in the case that the target weight value corresponding to the region of the target session member is not acquired from the saved weight values corresponding to the target regions of the target group, the information of the target region of each session member in the target group in the group call request from the target session member is acquired. Based on the information of each target region and the information of the region of the target member, the number of the session members in the target group in the region of the target session member is determined. According to the determined number, the weight value corresponding to the region of the target session member is determined, and the weight value corresponding to the region of the target session member and the group identification information of the target group are correspondingly saved.

In some embodiments, the unit weight value corresponding to any session member in the group is predetermined, for example, the unit weight value corresponding to any session member in the target group is 1.0. The weight value corresponding to the region of the target session member is determined according to the number of the session members in the region of the target session member in the target group and the predetermined unit weight value corresponding to any session member.

Still taking the above description as an example, in the case that the target group receives the group call request from the session member in the target region of India in the second group call, the target session member joins the current group call for the first time based on the method in the above embodiments, and the target weight value corresponding to the region of the target session member is not acquired from the saved weight values corresponding to the target regions of the target group, the information of the target region of each session member in the target group in the group call request from the target session member is acquired. According to the information of each target region and the information of the region of the target member, the number of the session member in the region of the target session member in the target group is determined to be 1, that is, the session member in the target region of India is 1. According to the determined number 1 and the predetermined unit weight value 1.0 corresponding to any session member, the weight value corresponding to India is determined to be 1.0, and the weight value 1.0 corresponding to the region India of the target session member and the group identification information of the target group are correspondingly saved.

In actual application scenarios, the session members in the target group greatly change each a time period. In order to ensure the accuracy of the weight value corresponding to each target region in the target region, in the embodiments of the present disclosure, a duration threshold is predetermined. In the case that the weight value corresponding to each target region and the group identification information corresponding to the target group are saved correspondingly based on the above embodiments, a timer starts to record a saving duration of the weight value corresponding to the target group. In the case that the saving duration of the weight value corresponding to the group reaches the predetermined duration threshold, the weight value corresponding to the group and the corresponding group identification information are deleted, such that the weight value corresponding to each target region in the group is re-determined based on the information of the target region of each session member in the current group in the first group call request in the case of receiving the first group call request from the calling party of the group again.

Sixth Embodiments

For improvement of the efficiency of determining the central server, based on the above embodiments, the method in the embodiments of the present disclosure further includes:

saving a corresponding relationship between the central server and a first region set including the target regions;

acquiring, in the case that a third group call request is received from a calling party of any group within a predetermined duration, information of regions of session members in a group in the third group call request; and directly determining, in the case that a second region set containing the information of the regions of the session members in the group is matched with the first region set assigned with the central server, the central server corresponding to the matched first region set as the central server for the group call of the group.

In actual application scenarios, upon receiving the group call request from the calling party of any group each time, the electronic device determines one server from multiple servers as the central server for the group in the call. However, there may be a case that a session member in a group performs multiple group calls in a short time, and the session members in each call are not changed, such that the central server determined each time is generally the same server. On this basis, in the embodiments of the present disclosure, upon determination of the central server for the group call of the target group based on the method in the above embodiments, a region set (referred to as the first region set for convenience of description) is determined according to the information of the target region of each session member in the group call, and the identification information of the central server and the second region set are correspondingly saved, such that the determined central server is directly determined as the central server for the group call of the group in the case that the group call request (referred to as the third group call request for convenience of description) is received again subsequently from the calling party of any group with the same distribution of session members as the group, and the determination of the central server for the group in the group call from the servers each time is avoided.

In order to further ensure the accuracy of determining the central server, in the embodiments of the present disclosure, the predetermined duration is predetermined to avoid the lower effectiveness and accuracy of the determined central server in determination of a central server corresponding to a first region set as the central server for other groups with the same distribution as the first region set in the group call. Specifically, upon determination of the central server for the group call of the target group based on the method in the above embodiments, it is also necessary to start a timer to record the determining duration of the central server in correspondingly saving the identification information of the central server and the first region set. In the case that the third group call request is received from the calling party of any group within the predetermined duration, the third group call request is parsed, the information of the region of each session member in the group in the third group call request is acquired, and a region set (referred to as the second region set for convenience of description) containing the information of the region of each session member is determined. The second region set is matched with the saved first region set assigned with the central server. In the case that the second region set is matched with any first region set, the central server corresponding to the matched first region set is directly determined as the central server for the group call of the group. In the case that the second region set is not matched with the first region sets, the central server for the group call of the group is determined based on the information of the region of each session member in the group according to the method for the above embodiments.

Matching means that the information of each region in the first region set is completely consistent with the information of each region in the second region set.

In one possible implementation, for reduction of resources consumed in storing the corresponding relationship between the first region set and the central server, the corresponding relationship between the first region set and the central server is deleted in the case that the determining duration of the central server corresponding to the first region set recorded by the timer is not less than the predetermined duration.

Seventh Embodiments

Figure 5:
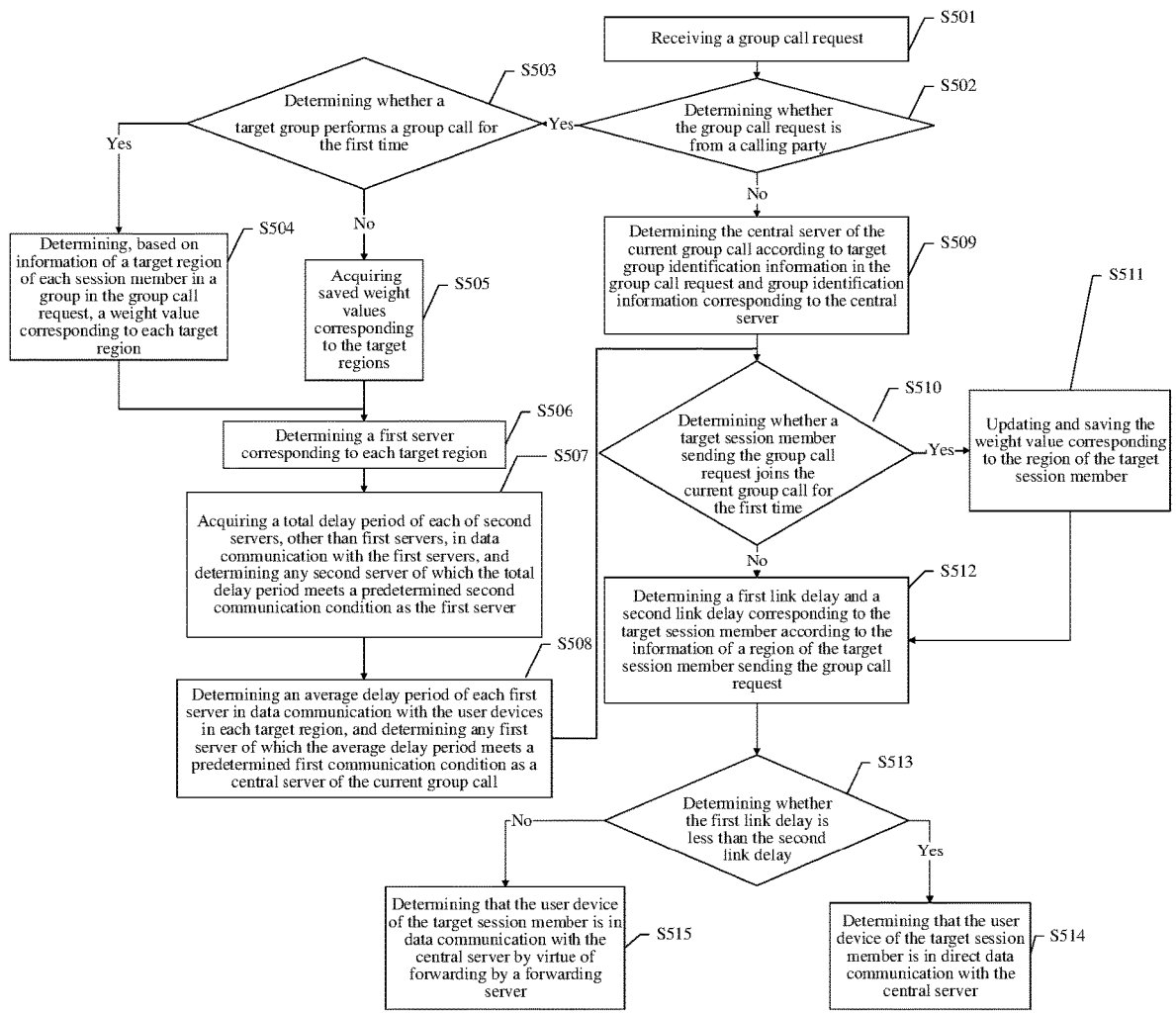
FIG. 5 is a schematic diagram of a specific server selection process according to some embodiments of the present disclosure.

The method for selecting the server according to the embodiments of the present disclosure are described in detail hereinafter through specific embodiments. FIG. 5 is a schematic diagram of a specific server selection process according to some embodiments of the present disclosure. The process includes the following processes.

In S501, a group call request is received.

In S502, whether the group call request is from a calling party is determined. S503 is performed in the case that the group call request is from the calling party, and otherwise, S509 is performed.

The specific method for determining whether the group call request is from the calling party has been described in the above embodiments, which is not repeated.

In S503, whether a target group performs a group call for the first time is determined. S504 is performed in the case that the target group performs the group call for the first time, and otherwise, S505 is performed.

Specifically, target group identification information of the target group is matched with saved group identification information which has performed the group call. In the case that there is matched group identification information, the target group does not perform the group call for the first time. In the case that there is no matched group identification information, the target group performs the group call for the first time.

In S504, a weight value corresponding to each target region is determined based on the information of the target region of each session member in the group in the group call request.

In S505, the saved weight value corresponding to each target region is acquired.

In S506, a first server corresponding to each target region is determined.

Specifically, for each target region, the first server corresponding to the target region is determined according to first delay periods of user devices in the target region in data communication with directly connected servers.

In S507, a total delay period of each of second servers, other than first servers, in data communication with each first server is acquired, and any second server of which the total delay period meets a predetermined second communication condition is determined as the first server.

The specific details have been described in the above embodiments, which are not repeated herein.

In S508, an average delay period of each first server in data communication with the user devices in each target region is determined, any first server of which the average delay period meets a predetermined first communication condition is determined as a central server of the current group call, and S510 is performed.

In S509, the central server of the current group call is determined according to the target group identification information in the group call request and the group identification information corresponding to the central server.

The specific details have been described in the above embodiments, which are not repeated herein.

In S510, whether a target session member sending the group call request joins the current group call for the first time is determined. S511 is performed in the case that the target session member joins the current group call for the first time, and otherwise, S512 is performed.

In S511, the weight value corresponding to the region of the target session member is updated and saved.

Specifically, the information of the region of the target session member is acquired based on the group call request.

In the case that a target weight value corresponding to the region of the target session member is acquired from the saved weight values corresponding to the target regions of the target group, the target weight value is updated and saved.

In the case that the target weight value corresponding to the region of the target session member is not acquired from the saved weight values corresponding to the target regions of the target group, the number of the session members in the region of the target session member is determined based on the information of each target region in the group call request, and the weight value corresponding to the region of the target session member is determined and saved based on the number of the session members.

In S512, a first link delay and a second link delay corresponding to the target session member are determined according to the information of a region of the target session member sending the group call request.

The first link delay is a link delay of a link over which the user device in the region of the target session member is in direct data communication with the central server, and the second link delay is a link delay of a link over which the user device in the region of the target session member is in data communication with the central server by virtue of forwarding by a forwarding server.

In S513, whether the first link delay is less than the second link delay is determined. S514 is performed in the case that the first link delay is less than the second link delay, and otherwise, S515 is performed.

In S514, the user device of the target session member being in direct data communication with the central server is determined.

In S515, the user device of the target session member being in data communication with the central server by virtue of forwarding by the forwarding server is determined.

Figure 6:
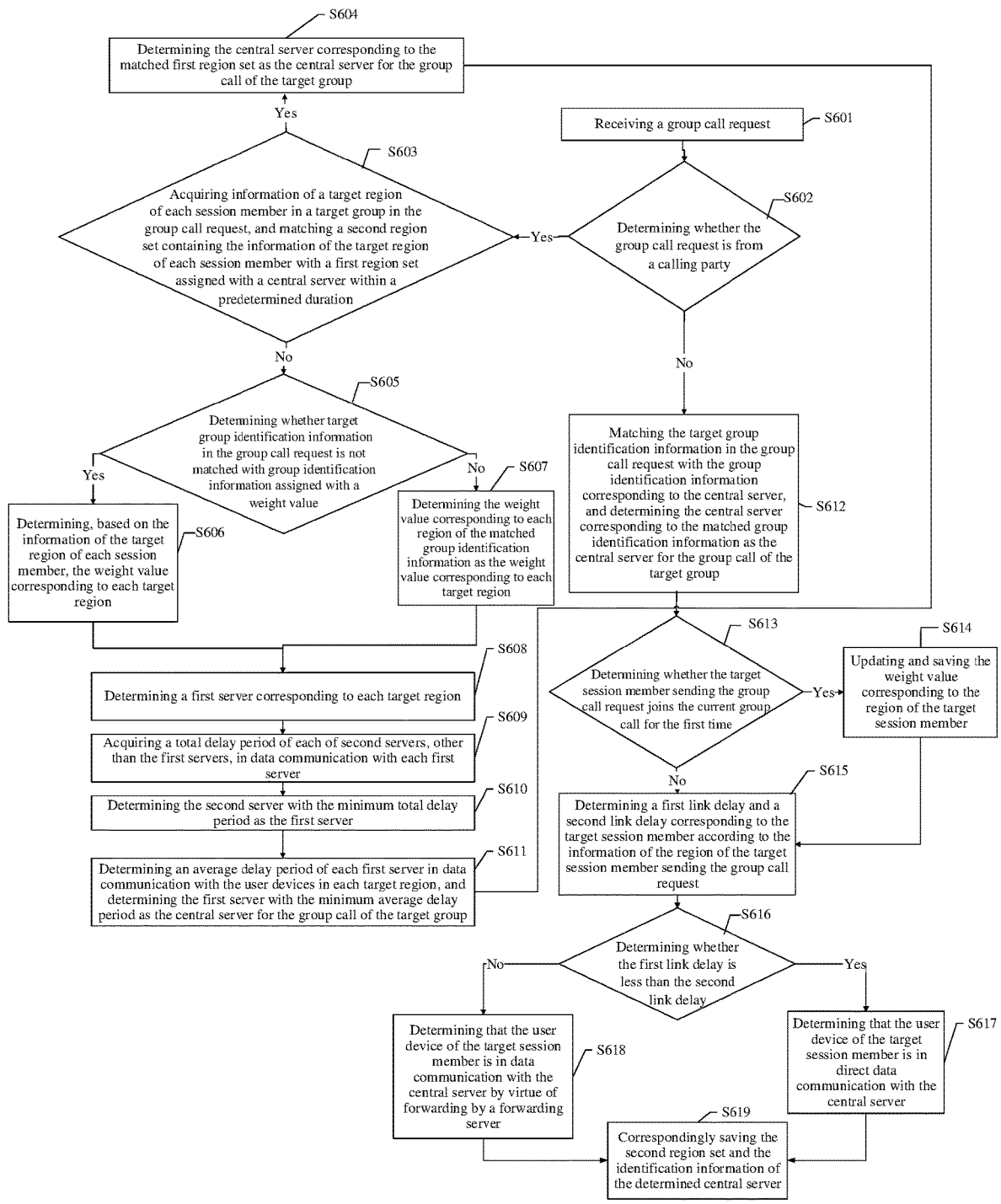
FIG. 6 is a schematic diagram of another specific server selection process according to some embodiments of the present disclosure.

FIG. 6 is a schematic diagram of another specific server selection process according to some embodiments of the present disclosure. The process includes the following processes.

In S601, a group call request is received.

In S602, whether the group call request is from a calling party is determined. S603 performed in the case that the group call request is from the calling party, and otherwise, S612 is performed.

In S603, the information of a target region of each session member in a target group in the group call request is acquired, and a second region set containing the information of the target region of each session member is matched with a first region set assigned with a central server within a predetermined duration. S604 is performed in the case that there is a matched first region set, and otherwise, S605 is performed.

In S604, the central server corresponding to the matched first region set is determined as the central server for the group call of the target group, and S613 is performed.

In S605, whether target group identification information in the group call request is not matched with group identification information assigned with a weight value is determined. S606 is performed in the case that the target group identification information is not matched with the group identification information assigned with the weight value, and otherwise, S607 is performed.

In S606, the weight value corresponding to each target region is determined based on the information of the target region of each session member, and S608 is performed.

In S607, the weight value corresponding to each region of the matched group identification information is determined as the weight value corresponding to each target region.

In S608, a first server corresponding to each target region is determined.

Specifically, for each target region, the first server corresponding to the target region is determined according to first delay periods of user devices in the target region in data communication with directly connected servers.

An order of S605 to S607 and S608 is not limited, S608 is performed, and then S605 to S607 are performed. Optionally, S605 to S607 are performed, and then S608 is performed. Optionally, S605 to S607 and S608 are performed simultaneously.

In S609, a total delay period of each of second servers, other than the first servers, the second server in data communication with each first server is acquired.

In S610, the second server with the minimum total delay period is determined as the first server.

In S611, an average delay period of each first server in data communication with the user devices in each target region is determined, the first server with the minimum average delay period is determined as the central server for the group call of the target group, and S613 is performed.

In S612, the target group identification information in the group call request is matched with the group identification information corresponding to the central server, and the central server corresponding to the matched group identification information is determined as the central server for the group call of the target group.

The specific details have been described in the above embodiments, which are not repeated herein.

In S613, whether the target session member sending the group call request joins the current group call for the first time is determined. S614 is performed in the case that the target session member joins the current group call for the first time, and otherwise 4, S615 is performed.

In S614, the weight value corresponding to the region of the target session member is updated and saved.

In S615, a first link delay and a second link delay corresponding to the target session member are determined according to the information of the region of the target session member sending the group call request.

In S616, whether the first link delay is less than the second link delay is determined. S617 is performed in the case that the first link delay is less than the second link delay, and otherwise, S618 is performed.

In S617, the user device of the target session member being in direct data communication with the central server is determined, and S619 is performed.

In S618, the user device of the target session member being in data communication with the central server by virtue of forwarding by a forwarding server is determined.

In S619, the second region set and the identification information of the determined central server are saved correspondingly.

It should be noted that the method for selecting the server according to the embodiments of the present disclosure is not limited to the group call scenarios, and is also applicable to other scenarios that rely on the central server for data communication, such as online games. Based on the description of the technical solutions of determination of the central server in the group call scenario according to the embodiments of the present disclosure, those skilled in the art can determine the technical solutions of determination of the central server in other scenarios that rely on the central server for data communication based on such descriptions. The specific details are not repeated herein.

Eighth Embodiments

Figure 7:
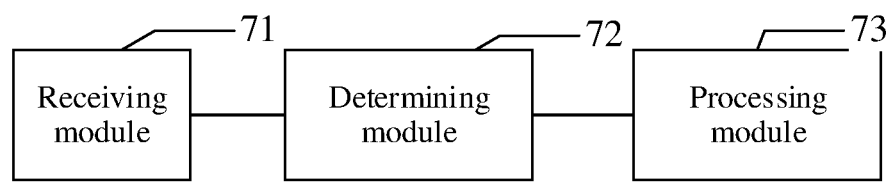
FIG. 7 is a schematic structural diagram of an apparatus for selecting a server according to some embodiments of the present disclosure.

FIG. 7 is a schematic structural diagram of an apparatus for selecting a server according to some embodiments of the present disclosure. The embodiments of the present disclosure provide an apparatus for selecting a server. The apparatus includes:

a receiving module 71, configured to receive a first group call request from a calling party of a target group, wherein the first group call request carries information of target regions of session members in the target group;

a determining module 72, configured to determine, according to first delay periods of user devices in each of the target regions in data communication with directly connected servers, a first server corresponding to the each of the target regions; and a processing module 73, configured to determine, according to each first server, a central server for a group call of the target group.

As the principle of solving the problem by the apparatus for selecting the server is similar to the method for selecting the server, the implementation of the above apparatus for selecting the server may be referred to the implementation of the method, which is not repeated herein.

In the embodiments of the present disclosure, upon receipt of the first group call request from the calling party of the target group, the information of each target region in the first group call request is acquired, and the first server corresponding to the target region is determined for the information of the target region according to the first delay periods of the user devices in the target region in data communication with the directly connected servers. For each acquired first server, the average delay period of the server in data communication with the user devices in each target region is acquired, and the central server for the group call of the target group is determined based on the average delay period corresponding to each acquired first server, such that the regions of the session members in the group call in the target group are taken into full consideration, and the accuracy of the determined central server and the quality of the group call are improved.

Ninth Embodiments

Figure 8:
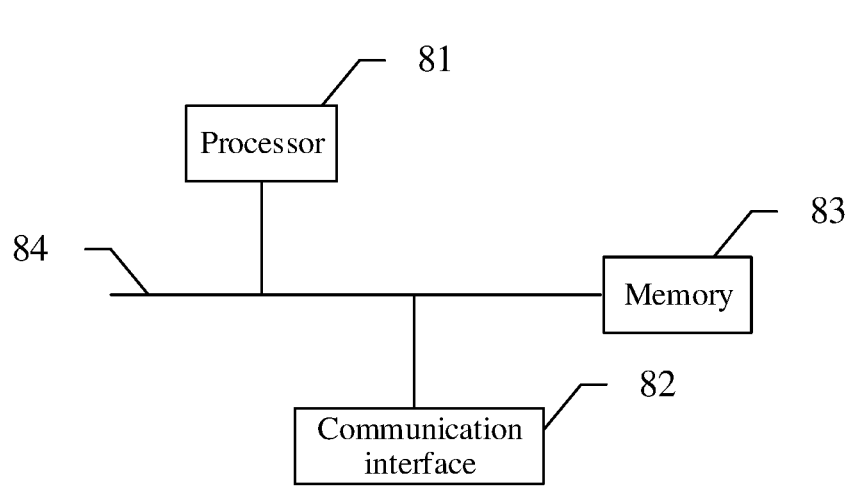
FIG. 8 is a schematic structural diagram of an electronic device according to some embodiments of the present disclosure.

FIG. 8 is a schematic structural diagram of an electronic device according to some embodiments of the present disclosure. The electronic device includes a processor 81, a communication interface 82, a memory 83, and a communication bus 84. The processor 81, the communication interface 82, and the memory 83 communicate with each other over the communication bus 84.

Computer programs are stored in the memory 83, and the computer programs, when loaded and run by the processor 81, cause the processor 81 to:

receive a first group call request from a calling party of a target group, wherein the first group call request carries information of target regions of session members in the target group;

determine, according to first delay periods of user devices in each of the target regions in data communication with directly connected servers, a first server corresponding to the each of the target regions; and determine, according to an average delay period of the first server in data communication with the user devices in the each of the target regions, a central server for a group call of the target group.

Tenth Embodiments

Based on the above embodiments, the embodiments of the present disclosure also provide a non-transitory computer-readable storage medium. Computer programs executable by a processor are stored, and the programs, when loaded and run by the processor, cause the processor to:

receive a first group call request from a calling party of a target group, wherein the first group call request carries information of target regions of session members in the target group;

determine, according to an average delay period of the first server in data communication with the user devices in the each of the target regions, a central server for a group call of the target group; and determine, according to an average delay period of the first server in data communication with the user devices in the each of the target regions, a central server for a group call of the target group.

As the principle of solving the problem by the computer-readable storage medium is similar to the method for selecting the server in the above embodiments, the specific implementation may be referred to the implementation of the method for selecting the server.

Apparently, various modifications and variations without departing from the spirit and scope of the present disclosure can be made to the present disclosure by those skilled in the art. Thus, the present disclosure is intended to include the modifications and variations therein in the case that these modifications and variations of the present disclosure are within the scope of the claims of the present disclosure and their technical equivalents.

The invention claimed is:

1. A method for selecting a server, applied in an electronic device, the method comprising:

receiving a first group call request from a calling party of a target group, wherein the first group call request carries information of target regions of session members in the target group;

determining, according to first delay periods of user devices in each of the target regions in data communication with servers that are located within a same target region as the user devices, a first server corresponding to each of the target regions, wherein the user devices in each of the target regions are user devices utilized by the session members;

acquiring a total delay period of each of second servers in data communication with the first servers, wherein the second servers are servers in the target regions other than the first servers;

determining any of the second servers of which the total delay period meets a predetermined second communication condition as the first server;

determining, according to an average delay period of the first server in data communication with the user devices in each of the target regions, a central server for a group call of the target group; and using, in a subsequent group call of the target group, the central server to receive data from the calling party and a forwarding server, and manage and distribute data as received;

wherein determining, according to the average delay period of the first server in data communication with the user devices in each of the target regions, the central server for the group call of the target group comprises: determining any of the first servers of which the average delay period meets a predetermined first communication condition as the central server, wherein the first server of which the average delay period meets the predetermined first communication condition is a first server with a minimum load among first servers corresponding to predetermined number of average delay periods in a descending order of the average delay periods.

2. The method according to claim 1, wherein the total delay period meeting the predetermined second communication condition comprises:
the total delay period being a minimum value; or
the total delay period being less than a predetermined delay threshold.

3. The method according to claim 1, wherein determining the average delay period of the first server in data communication with the user devices in each of the target regions comprises:
acquiring a weight value corresponding to each of the target regions; and
determining, according to second delay periods corresponding to each of the target regions and the weight value corresponding to each of the target regions, the average delay period of the first server, wherein the second delay periods corresponding to each of the target regions are delay periods of the first server in communication with the user devices in each of the target regions.

4. The method according to claim 3, wherein determining, according to the second delay periods and the weight value corresponding to each of the target regions, the average delay period of the first server comprises:
determining products of the second delay periods corresponding to each of the target regions and the weight value corresponding to each of the target regions; and
determining, based on the products and the weight value, the average delay period of the first server.

5. The method according to claim 3, wherein in the case that the first group call request further carries target group identification information of the target group, acquiring the weight value corresponding to each of the target regions comprises:
determining, in the case that the target group identification information is not matched with group identification information assigned with the weight value, the weight value corresponding to each of the target regions according to a number of the session members in each of the target regions in the target group.

6. The method according to claim 1, further comprising:
receiving a second group call request from a called party of the target group, wherein the second group call request carries target group identification information of the target group;
acquiring group identification information matched with the target group identification information and corresponding to the central server; and determining, based on the central server corresponding to the matched group identification information, the central server for the group call of the target group.

7. The method according to claim 6, wherein upon determining the central server for the group call of the target group, the method further comprises:
determining, according to information of a region of a target session member sending a group call request, a first link delay and a second link delay corresponding to the target session member, wherein the group call request is the first group call request or the second group call request, the first link delay is a link delay of a link over which a user device in the region of the target session member is in direct data communication with the central server, and the second link delay is a link delay of a link over which the user device in the region of the target session member is in data communication with the central server by virtue of forwarding by a forwarding server; and
determining whether the user device in the region of the target session member is currently communicating with the central server using a direct link or using an indirect link using the forwarding server based on the first link delay and the second link delay.

8. The method according to claim 7, further comprising:
acquiring, in the case that the target session member sending a group call request joins a current group call for the first time, information of a region of the target session member based on the group call request, wherein the group call request is the first group call request or the second group call request; and
updating and saving a target weight value corresponding to the region of the target session member in the case that the target weight value corresponding to the region of the target session member is acquired from saved weight values corresponding to the target regions of the session members in the target group.

9. The method according to claim 8, further comprising:
determining, in the case that the target weight value corresponding to the region of the target session member is not acquired from the saved weight values corresponding to the target regions of the session members in the target group, a number of the session members in the region of the target session member based on information of target regions in the group call request; and
determining and saving, based on the number of the session members, a weight value corresponding to the region of the target session member.

10. The method according to claim 1, further comprising:
saving a corresponding relationship between the central server and a first region set comprising the target regions;
acquiring, in the case that a third group call request is received from a calling party of any group within a predetermined duration, information of regions of session members in a group in the third group call request; and
directly determining, in the case that a second region set containing the information of the regions of the session members in the group is matched with the first region set assigned with the central server, the central server corresponding to the matched first region set as the central server for the group call of the group.

11. An electronic device for selecting a server, at least comprising a processor and a memory storing one or more computer programs therein, wherein the processor, when loading and running the one or more computer programs, is caused to:
receive a first group call request from a calling party of a target group, wherein the first group call request carries information of target regions of session members in the target group;
determine, according to first delay periods of user devices in each of the target regions in data communication with servers that are located within a same target region as the user devices, a first server corresponding to each of the target regions, wherein the user devices in each of the target regions are user devices utilized by the session members;
acquire a total delay period of each of second servers in data communication with the first servers, wherein the second servers are servers in the target regions other than the first servers;
determine any of the second servers of which the total delay period meets a predetermined second communication condition as the first server;
determine, according to an average delay period of the first server in data communication with the user devices in each of the target regions, a central server for a group call of the target group; and
using, in a subsequent group call of the target group, the central server to receive data from the calling party and a forwarding server, and manage and distribute data as received;
wherein determining, according to the average delay period of the first server in data communication with the user devices in each of the target regions, the central server for the group call of the target group comprises:
determining any of the first servers of which the average delay period meets a predetermined first communication condition as the central server, wherein the first server of which the average delay period meets the predetermined first communication condition is a first server with a minimum load among first servers corresponding to predetermined number of average delay periods in a descending order of the average delay periods.

12. The electronic device for selecting the server according to claim 11, wherein the total delay period meeting the predetermined second communication condition comprises:
the total delay period being a minimum value; or
the total delay period being less than a predetermined delay threshold.

13. The electronic device for selecting the server according to claim 11, wherein the processor, when loading and running the one or more computer programs, is caused to:
acquire a weight value corresponding to each of the target regions; and
determine, according to second delay periods corresponding to each of the target regions and the weight value corresponding to each of the target regions, the average delay period of the first server, wherein the second delay periods corresponding to each of the target regions are delay periods of the first server in communication with the user devices in each of the target regions.

14. The electronic device for selecting the server according to claim 13, wherein the processor, when loading and running the one or more computer programs, is caused to:
determine products of the second delay periods corresponding to each of the target regions and the weight value corresponding to each of the target regions; and
determine, based on the products and the weight value, the average delay period of the first server.

15. The electronic device for selecting the server according to claim 13, wherein in the case that the first group call request further carries target group identification information of the target group, the processor, when loading and running the one or more computer programs, is caused to:
determine, in the case that the target group identification information is not matched with group identification information assigned with the weight value, the weight value corresponding to each of the target regions according to a number of the session members in each of the target regions in the target group.

16. A non-transitory computer-readable storage medium, storing one or more computer programs therein, wherein the one or more computer programs, when loaded and run by a processor, cause the processor to:
receive a first group call request from a calling party of a target group, wherein the first group call request carries information of target regions of session members in the target group;
determine, according to first delay periods of user devices in each of the target regions in data communication with servers that are located within a same target region as the user devices, a first server corresponding to each of the target regions, wherein the user devices in each of the target regions are user devices utilized by the session members;
acquire a total delay period of each of second servers in data communication with the first servers, wherein the second servers are servers in the target regions other than the first servers;
determine any of the second servers of which the total delay period meets a predetermined second communication condition as the first server;
determine, according to an average delay period of the first server in data communication with the user devices in each of the target regions, a central server for a group call of the target group; and
using, in a subsequent group call of the target group, the central server to receive data from the calling party and a forwarding server, and manage and distribute data as received;
wherein determining, according to the average delay period of the first server in data communication with the user devices in each of the target regions, the central server for the group call of the target group comprises:
determining any of the first servers of which the average delay period meets a predetermined first communication condition as the central server, wherein the first server of which the average delay period meets the predetermined first communication condition is a first server with a minimum load among first servers corresponding to predetermined number of average delay periods in a descending order of the average delay periods.

* * * * *